United States Patent
Toyota et al.

(10) Patent No.: US 10,584,789 B2
(45) Date of Patent: Mar. 10, 2020

(54) CONTROL METHOD AND CONTROL DEVICE OF CONTINUOUSLY VARIABLE TRANSMISSION

(71) Applicant: Nissan Motor Co., Ltd., Kanagawa (JP)

(72) Inventors: Ryohey Toyota, Kanagawa (JP); Tomoyuki Nakano, Kanagawa (JP); Hiromu Terai, Kanagawa (JP); Akira Takano, Kanagawa (JP); Kouhei Toyohara, Sagamihara (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/329,591

(22) PCT Filed: Aug. 7, 2017

(86) PCT No.: PCT/JP2017/028641
§ 371 (c)(1),
(2) Date: Feb. 28, 2019

(87) PCT Pub. No.: WO2018/043056
PCT Pub. Date: Mar. 8, 2018

(65) Prior Publication Data
US 2019/0195343 A1    Jun. 27, 2019

(30) Foreign Application Priority Data

Aug. 29, 2016    (JP) .................................. 2016-166775

(51) Int. Cl.
*F16H 59/36* (2006.01)
*F16H 59/50* (2006.01)
(Continued)

(52) U.S. Cl.
CPC ............. *F16H 59/36* (2013.01); *F16H 59/50* (2013.01); *F16H 61/00* (2013.01); *F16H 61/06* (2013.01); *F16H 61/662* (2013.01)

(58) Field of Classification Search
CPC .......... F16H 59/36; F16H 59/50; F16H 61/06; F16H 61/061; F16H 61/662
See application file for complete search history.

(56) References Cited

U.S. PATENT DOCUMENTS

| 6,243,638 B1 | 6/2001 | Abo et al. |
| 2010/0035721 A1 | 2/2010 | Rothenbuhler et al. |

(Continued)

FOREIGN PATENT DOCUMENTS

| JP | S63-222942 A | 9/1988 |
| JP | 2000-193075 A | 7/2000 |

(Continued)

*Primary Examiner* — Edwin A Young
(74) *Attorney, Agent, or Firm* — Osha Liang LLP (57) ABSTRACT

A control method of a continuously variable transmission includes supplying oil pressure to a line-pressure oil passage and a secondary pulley oil chamber by a source pressure oil pump, controlling a flow of oil into and from a primary pulley oil chamber by an electric oil pump arranged in an oil passage between the primary pulley oil chamber and the secondary pulley oil chamber, and limiting a discharge flowrate of the electric oil pump to an amount smaller than a discharge flowrate of the source pressure oil pump.

7 Claims, 5 Drawing Sheets

(51) Int. Cl.
*F16H 61/06* (2006.01)
*F16H 61/662* (2006.01)
*F16H 61/00* (2006.01)

(56) References Cited

U.S. PATENT DOCUMENTS

| | | | |
|---|---|---|---|
| 2015/0025739 A1* | 1/2015 | Wakairo | F16H 61/0025 701/36 |
| 2016/0115951 A1* | 4/2016 | Snyder | F04B 43/046 417/48 |
| 2016/0146338 A1* | 5/2016 | Ogata | F16H 61/0021 137/565.13 |
| 2016/0208719 A1* | 7/2016 | Kawatsu | F04B 17/05 |
| 2016/0222903 A1* | 8/2016 | Glauber | F02D 41/2432 |

FOREIGN PATENT DOCUMENTS

| | | |
|---|---|---|
| JP | 2008-240894 A | 10/2008 |
| JP | 2014-228086 A | 12/2014 |

\* cited by examiner

CONTROL METHOD AND CONTROL DEVICE OF CONTINUOUSLY VARIABLE TRANSMISSION

CROSS-REFERNCE TO RELATED APPLICATIONS

This application is a national stage application of PCT Application No. PCT/JP2017/028628 filed Aug. 7, 2017, and claims priority to Japanese Patent Application No. 2016-166775 filed on Aug. 29, 2016, in the Japan Patent Office, the entire contents of which are incorporated herein by reference in their entirety.

BACKGROUND

Technical Field

The present invention relates to control of a continuously variable transmission.

Related Art

JP2008-240894A discloses a hydraulic circuit of a continuously variable transmission including a source pressure oil pump adapted to pump up oil from an oil pan and generate line pressure serving as source pressure for shift, and an electric oil pump for shift. In the hydraulic circuit described in the above document, communication is provided between a primary pulley oil chamber and a secondary pulley oil chamber, and the electric oil pump is placed in a shift oil passage connected to an oil passage of the line pressure. In the hydraulic circuit described in the above document, by adjusting a flow of the oil into and from the primary pulley oil chamber by the electric oil pump, shift control is performed.

SUMMARY OF INVENTION

In the shift control described in the aforementioned document, the source pressure needs to be maintained by the source oil pump when the electric shift oil pump is operated. That is, a supply flowrate by the source oil pump needs to be larger than the supply flowrate of the electric shift oil pump. However, in a state where the source pressure has not been sufficiently raised such as immediately after an internal combustion engine system including the continuously variable transmission was started in a so-called no-oil state, for example, there is a concern that the supply flowrate of the source oil pump becomes smaller than the supply flowrate of the shift oil pump during the shift control. In this case, the source pressure lowers, and a target speed ratio cannot be realized. However, in the aforementioned document, a situation in which the source pressure lowers as above is not described.

Thus, one or more embodiments of the present invention provides a control method and a control device which can realize appropriate speed ratio control even in the state where the source pressure has not been sufficiently raised as described above.

According to one or more embodiments of the present invention, a control method of a continuously variable transmission, comprising supplying oil pressure to a linepressure oil passage and a secondary pulley oil chamber by a source pressure oil pump and controlling a flow of oil into and from a primary pulley oil chamber by an electric oil pump arranged in an oil passage between the primary pulley oil chamber and the secondary pulley oil chamber, is provided. In the control method, a discharge flowrate of the electric oil pump is limited to an amount smaller than the discharge flowrate of the source pressure oil pump.

DETAILED DESCRIPTION

Hereinafter, embodiments of the present invention will be described by referring to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
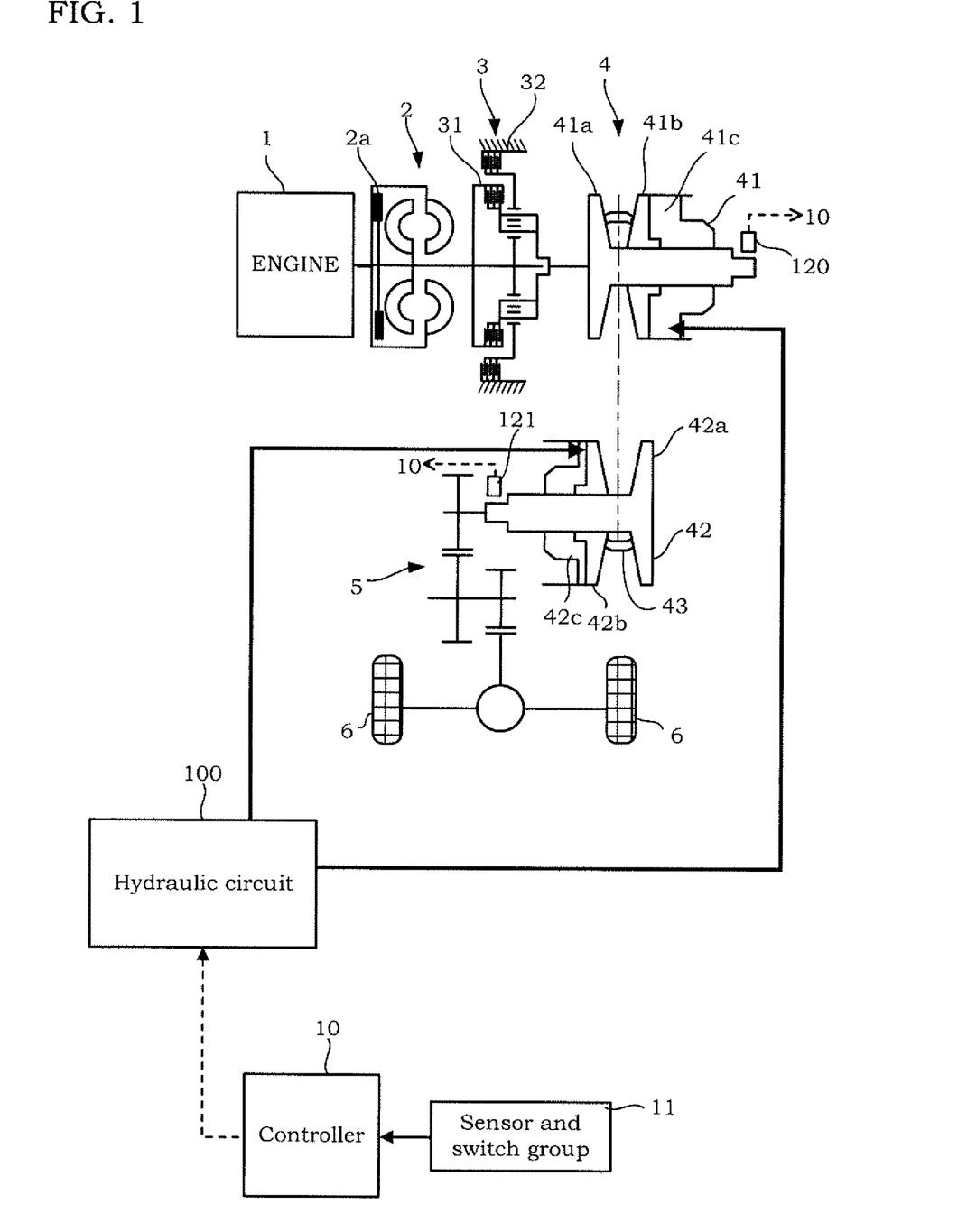
FIG. 1 is a schematic configuration diagram of a vehicle.

FIG. 1 is a schematic configuration diagram of a vehicle. The vehicle includes an engine 1, a torque converter 2 with a lockup clutch 2a, a forward/reverse switching mechanism 3, a variator 4, a final reduction mechanism 5, a drive wheels 6, and a hydraulic circuit 100.

The engine 1 is a driving source of the vehicle. An output of the engine 1 is transmitted to the drive wheels 6 via the torque converter 2, the forward/reverse switching mechanism 3, the variator 4, and the final reduction mechanism 5. Therefore, the variator 4 is provided in a power transmission route adapted to transmit power from the engine 1 to the drive wheels 6 together with the torque converter 2, the forward/reverse switching mechanism 3, and the final reduction mechanism 5.

The forward/reverse switching mechanism 3 is provided between the torque converter 2 and the variator 4 in the aforementioned power transmission route. The forward/reverse switching mechanism 3 switches a rotation direction of input rotation between a forward rotation direction corresponding to forward run and a reverse rotation direction corresponding to a reverse run.

Specifically, the forward/reverse switching mechanism 3 includes a forward clutch 31 and a reverse brake 32. The forward clutch 31 is engaged in a case where the rotation direction is the forward rotation direction. The reverse brake 32 is engaged in a case where the rotation direction is the reverse rotation direction. One of the forward clutch 31 and the reverse brake 32 can be formed as a clutch adapted to turn rotation on and off between the engine 1 and the variator 4.

The variator 4 has a primary pulley 41, a secondary pulley 42, and a belt 43 looped over the primary pulley 41 and the secondary pulley 42. Hereinafter, the term "primary" will also be referred to as "PRI," and the term "secondary" will also be referred to as "SEC." The variator 4 changes a loop diameter of the belt 43 (hereinafter, also simply referred to as the "loop diameter") by changing groove widths of the PRI pulley 41 and the SEC pulley 42, and forms a belt continuously variable transmission mechanism adapted to perform shift.

The PRI pulley 41 includes a fixed pulley 41a and a movable pulley 41b. A controller 10 controls an oil amount to be supplied to a PRI pulley oil chamber 41c, whereby the movable pulley 41b is operated, and the groove width of the PRI pulley 41 is changed.

The SEC pulley 42 includes a fixed pulley 42a and a movable pulley 42b. The controller 10 controls the oil amount to be supplied to the SEC pulley oil chamber 42c, whereby the movable pulley 42b is operated, and the groove width of the SEC pulley 42 is changed.

The belt 43 is looped over a V-shaped sheave surface formed by the fixed pulley 41a and the movable pulley 41b of the PRI pulley 41, and a V-shaped sheave surface formed by the fixed pulley 42a and the movable pulley 42b of the SEC pulley 42.

The final reduction mechanism 5 transmits output rotation from the variator 4 to the drive wheels 6. The final reduction mechanism 5 has plural gear trains and differential gears. The final reduction mechanism 5 rotates the drive wheels 6 via an axle.

The hydraulic circuit 100 supplies oil pressure to the variator 4, specifically, to the PRI pulley 41 and the SEC pulley 42. The hydraulic circuit 100 also supplies the oil pressure to the forward/reverse switching mechanism 3, the lock-up clutch 2a, and a lubrication system and a cooling system (not shown). Specifically, the hydraulic circuit 100 is formed as follows.

Figure 2:
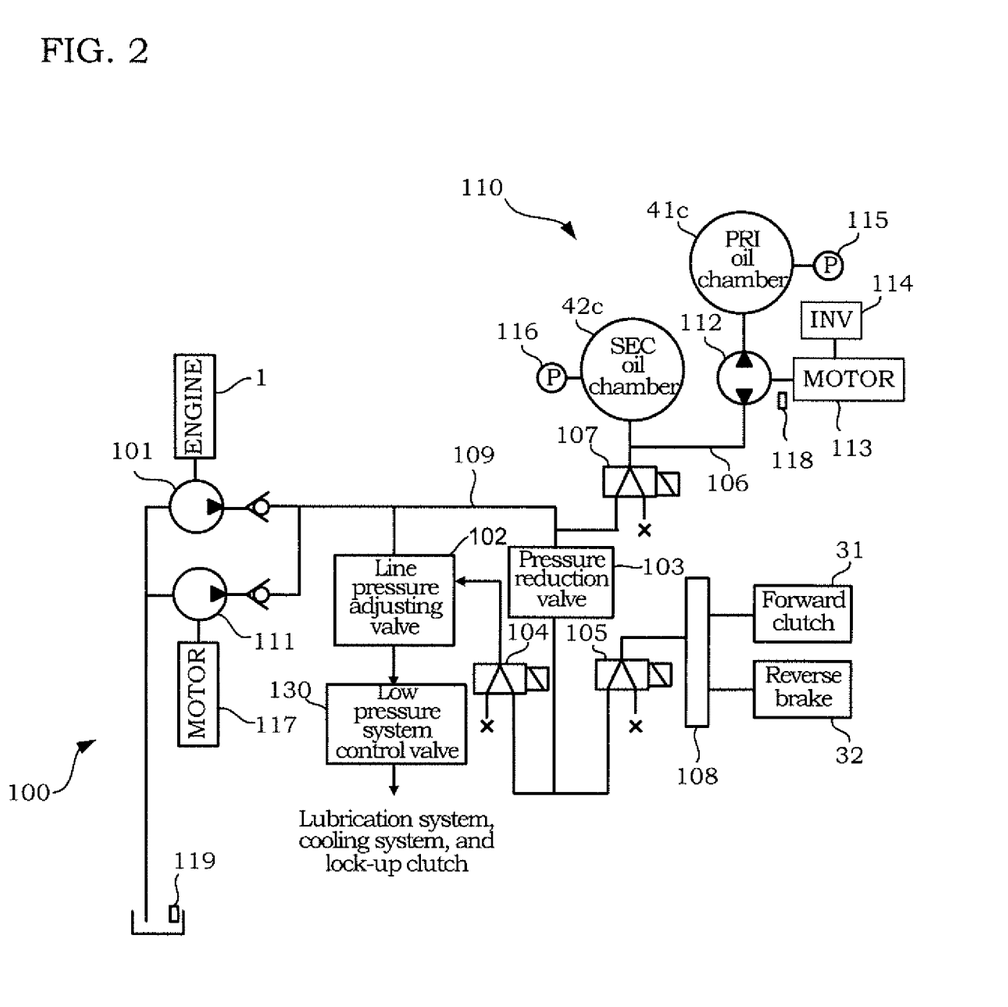
FIG. 2 is a schematic configuration diagram of a hydraulic circuit.

FIG. 2 is a schematic configuration diagram of the hydraulic circuit 100. The hydraulic circuit 100 includes a source pressure oil pump 101, a line pressure adjusting valve 102, a pressure reduction valve 103, a line pressure solenoid valve 104, a forward/reverse switching mechanism solenoid valve 105, a shift circuit pressure solenoid valve 107, a manual valve 108, a line pressure oil passage 109, a low pressure system control valve 130, a shift circuit 110, and a line pressure electric oil pump 111. Hereinafter, the solenoid valve will be referred to as the SOL.

The source pressure oil pump 101 is a mechanical oil pump to be driven by motive power of the engine 1. The source pressure oil pump 101 is connected to the line pressure adjusting valve 102, the pressure reduction valve 103, and the shift circuit pressure SOL 107 and the shift circuit 110 via the line pressure oil passage 109. The line pressure oil passage 109 forms an oil passage of line pressure. The line pressure is oil pressure serving as source pressure of the PRI pressure and the SEC pressure.

The line pressure electric oil pump 111 is driven by an electric motor 117. The line pressure electric oil pump 111 is operated for supplying the line pressure for example in a case where the engine 1 is stopped by idling stop control and accordingly the source pressure oil pump 101 is stopped.

The line pressure adjusting valve 102 generates the line pressure by adjusting the oil pressure generated by the oil pump 101. The generation of the line pressure by the oil pump 101 includes generation of the line pressure on the basis of such an action of the line pressure adjusting valve 102. Oil released by the line pressure adjusting valve 102 at the time of pressure adjustment is supplied to the lock-up clutch 2a, the lubrication system, and the cooling system via the low pressure system control valve 130.

The pressure reduction valve 103 reduces the line pressure. The oil pressure reduced by the pressure reduction valve 103 is supplied to the line pressure SOL 104 and the forward/reverse switching mechanism SOL 105.

The line pressure SOL 104 is a linear solenoid valve and generates control oil pressure corresponding to a control electric current. The control oil pressure generated by the line pressure SOL 104 is supplied to the line pressure adjusting valve 102, and the line pressure adjusting valve 102 is activated in accordance with the control oil pressure generated by the line pressure SOL 104 to perform pressure adjustment. Therefore, it is possible to set a command value of line pressure PL by the control electric current to the line pressure SOL 104.

The forward/reverse switching mechanism SOL 105 is a linear solenoid valve and generates oil pressure corresponding to a control electric current. The oil pressure generated by the forward/reverse switching mechanism SOL 105 is supplied to the forward clutch 31 and the reverse brake 32 via the manual valve 108 activated in accordance with operation of a driver.

The shift circuit pressure SOL 107 is a linear solenoid valve and generates oil pressure to be supplied to the shift circuit 110 in accordance with a control electric current. Therefore, it is possible to set a command value of shift circuit pressure by the control electric current to the shift circuit pressure SOL 107. The shift circuit pressure generated by the shift circuit pressure SOL 107 is supplied to a shift oil passage 106. The shift circuit pressure may be generated by a SOL adapted to generate control oil pressure corresponding to a control electric current, and a pressure adjusting valve adapted to generate control circuit pressure from the line pressure PL in accordance with the control oil pressure generated by the SOL.

The shift circuit 110 includes a shift oil passage 106 connected to the line pressure oil passage 109 via the shift circuit pressure SOL 107, and a shift oil pump 112 placed in the shift oil passage 106. The shift oil passage 106 provides communication between the PRI pulley oil pressure chamber 41c and the SEC pulley oil pressure chamber 42c.

The shift oil pump 112 is an electric oil pump to be driven by an electric motor 113. The electric motor 113 is controlled by the controller 10 via an inverter 114. The rotation direction of the shift oil pump 112 is switchable between the forward direction and the reverse direction. The forward direction mentioned above is the direction in which the oil is fed from the SEC pulley oil pressure chamber 42c side to the PRI pulley oil pressure chamber 41c side. The reverse direction is the direction in which the oil is fed from the PRI pulley oil pressure chamber 41c side to the SEC pulley oil pressure chamber 42c side.

When the shift oil pump 112 is rotated in the forward direction, the oil in the shift oil passage 106 and the SEC pulley oil pressure chamber 42c is supplied to the PRI pulley oil pressure chamber 41c. Thereby, the movable pulley 41b of the PRI pulley 41 is moved in the direction of coming close to the fixed pulley 41a, and the groove width of the PRI pulley 41 is reduced. Meanwhile, the movable pulley 42b of the SEC pulley 42 is moved in the direction of going away from the fixed pulley 42a, and the groove width of the SEC pulley 42 is increased. At the time of forward rotation of the shift oil pump 112, the oil is supplied from the line pressure oil passage 109 to the shift oil passage 106 in such a manner that oil pressure of the shift oil passage 106 on the SEC pulley oil pressure chamber 42c side (hereinafter, also referred to as the "SEC side") of the shift oil pump 112 (hereinafter, also referred to as the "SEC side oil pressure") is not less than the command value of the shift circuit pressure. The command value of the shift circuit pressure is set in consideration with prevention of slip of the belt 43, etc. Oil pressure of the shift oil passage 106 on the PRI pulley oil pressure chamber 41c side (hereinafter, also referred to as the "PRI side") of the shift oil pump 112 will also be referred to as the PRI side oil pressure.

When the shift oil pump 112 is rotated in the reverse direction, the oil flows out of the PRI pulley oil chamber 41c. Thereby, the movable pulley 41b of the PRI pulley 41 is moved in the direction of going away from the fixed pulley 41a, and the groove width of the PRI pulley 41 is increased. Meanwhile, the movable pulley 42b of the SEC pulley 42 is moved in the direction of coming close to the fixed pulley 42a, and the groove width of the SEC pulley 42 is reduced. Although the SEC side oil pressure is increased by an inflow of the oil flowing out of the PRI pulley oil pressure chamber 41c, the SEC side oil pressure is controlled not to exceed the command value by the shift circuit pressure SOL 107. That is, in a case where the SEC side oil pressure exceeds the command value, the oil is discharged from the shift oil passage 106 via the shift circuit pressure SOL 107. Meanwhile, in a case where the SEC side oil pressure is less than the command value, the oil flows in from the line pressure oil passage 109 via the shift circuit pressure SOL 107.

As described above, in the continuously variable transmission of one or more embodiments of the present invention, shift is performed by the shift oil pump 112 controlling a flow of the oil into and from the PRI pulley oil pressure chamber 41c. An outline of shift control will be described later.

Returning to FIG. 1, the vehicle further includes the controller 10. The controller 10 is an electronic control device, and signals from a sensor and switch group 11 are inputted to the controller 10. The controller 10 is formed by a microcomputer including a central processing unit (CPU), a read-only memory (ROM), a random access memory (RAM), and an input/output interface (I/O interface). The controller 10 may be formed by plural microcomputers.

The sensor and switch group 11 includes an accelerator pedal opening sensor adapted to detect an accelerator pedal opening of the vehicle, a brake sensor adapted to detect brake pedal force of the vehicle, a vehicle speed sensor adapted to detect vehicle speed Vsp, and an engine rotation speed sensor adapted to detect rotation speed NE of the engine 1.

The sensor and switch group 11 further includes, for example, a PRI pressure sensor 115 adapted to detect the PRI pressure, a SEC pressure sensor 116 adapted to detect the SEC pressure, a PRI rotation speed sensor 120 adapted to detect input side rotation speed of the PRI pulley 41, a SEC rotation speed sensor 121 adapted to detect output side rotation speed of the SEC pulley 42, a pump rotation speed sensor 118 adapted to detect rotation speed of the shift oil pump 112, and an oil temperature sensor 119 adapted to detect a temperature of the oil. The signals from the sensor and switch group 11 may be inputted to the controller 10 via other controllers, for example. The same is applied to signals of information, etc. generated by other controllers on the basis of the signals from the sensor and switch group 11.

The controller 10 controls the hydraulic circuit 100 on the basis of the signals from the sensor and switch group 11. Specifically, the controller 10 controls the line pressure SOL 104 and the shift circuit 110 shown in FIG. 2. The controller 10 is formed to further control the forward/reverse switching mechanism SOL 105 and the shift circuit pressure SOL 107.

Upon controlling the line pressure SOL 104, the controller 10 applies a control electric current corresponding to the command value of the line pressure PL to the line pressure SOL 104.

When executing the shift control, the controller 10 sets a target speed ratio on the basis of the signals from the sensor and switch group 11. Once the target speed ratio is determined, loop dimeters (target loop diameters) of the pulleys 41, 42 for realizing the target speed ratio are determined.

Once the target loop diameters are determined, groove widths (target groove widths) of the pulleys 41, 42 for realizing the target loop diameters are determined.

In the shift circuit 110, the movable pulley 41b of the PRI pulley 41 is moved in accordance with the inflow and the outflow of the oil to and from the PRI pulley oil pressure chamber 41c by the shift oil pump, and accordingly, the movable pulley 42b of the SEC pulley 42 is also moved. That is, there is a correlation between a movement amount of the movable pulley 41b of the PRI pulley 41 and a movement amount of the movable pulley 42b of the SEC pulley 42.

The controller 10 operates the shift oil pump 112 in such a manner that a position of the movable pulley 41b of the PRI pulley 41 is a position corresponding to the target speed ratio. Whether or not the movable pulley 41b is at a desired position is determined by calculating an actual speed ratio from detection values of the PRI rotation speed sensor 120 and the SEC rotation speed sensor 121 and determining whether or not the actual speed ratio matches with the target speed ratio.

The operation of the shift oil pump 112 by the controller 10 is not limited to the time of shift. Even in a case where the target speed ratio is not changed but in a case where the oil is leaked out of the pulley oil pressure chambers 41c, 42c and the actual speed ratio is changed, the controller 10 operates the shift oil pump 112. In one or more embodiments of the present invention, such control for maintaining the target speed ratio is included in the shift control.

That is, the shift control of one or more embodiments of the present invention is feedback control of bringing the position of the movable pulley 41b of the PRI pulley 41 to a target position. An object to be controlled in the feedback control is not the oil pressure of the pulley oil pressure chambers 41c, 42c but the groove width of the PRI pulley 41, in other words, the position of the movable pulley 41b.

A sensor adapted to detect the position of the movable pulley 41b may be provided to determine whether or not the movable pulley 41b is at a position corresponding to the target speed ratio.

When the oil is supplied to the PRI pulley oil chamber 41c by rotating the shift oil pump 112 forward, if a supply flowrate of the oil by the source pressure oil pump 101 is not sufficient, lack of source pressure occurs. If the source pressure is insufficient, the SEC pressure can no longer be controlled to the target value and thus, appropriate shifting control cannot be executed. Moreover, if the source pressure is insufficient, oil supply amounts to the lockup clutch 2a, the forward clutch 31, the reverse brake 32, the lubrication system, and the cooling system run short. Therefore, in order to execute the aforementioned feedback control, the source pressure should be maintainable as a premise when the shift oil pump 112 is operated. In general, the one having a capacity larger than that of the shift oil pump 112 is used for the source pressure oil pump 101 and thus, such a situation that the source pressure is insufficient as above cannot occur easily. However, if the engine 1 is operated in a low-rotation speed area, for example, the rotation speed of the source pressure oil pump 101 is also low, and if the shift oil pump 112 is rotated forward in such a state, lack of the source pressure occurs depending on the rotation speed of the shift oil pump 112. Moreover, the same applies to a case where the rotation speed of the source pressure oil pump 101 is low, and the line pressure has not developed sufficiently such as at initial start of an internal combustion engine system including the continuously variable transmission. Furthermore, the same applies also to a case where the supply flowrate of the source pressure oil pump 101 lowers due to deterioration over time. In the case where the source pressure oil pump 101 is electrical, too, there is a concern that the source pressure is insufficient in association with the operation of the shift oil pump 112 if the source pressure has not developed sufficiently immediately after the start of the system or if the supply flowrate lowers due to deterioration over time or the like.

Thus, in one or more embodiments of the present invention, in order to suppress lowering of the source pressure associated with the operation of the shift oil pump 112, the controller 10 executes control which will be described below.

Figure 3:
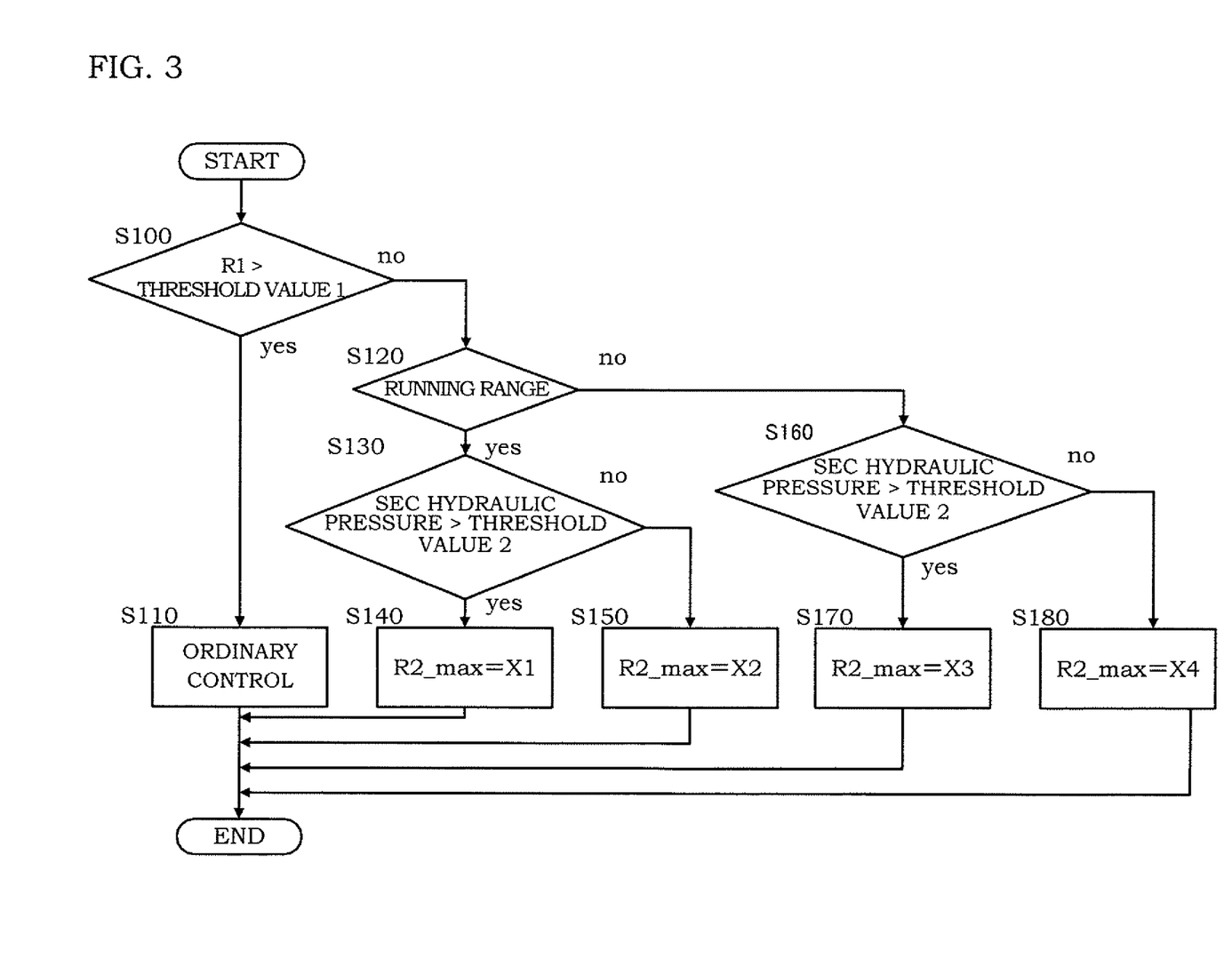
FIG. 3 is a flowchart illustrating a control routine of a rotation speed of an shift oil pump.

FIG. 3 is a flowchart illustrating a control routine of the hydraulic circuit 100 that the controller 10 executes at start of the engine. The control routine is executed at a certain interval (every several milliseconds, for example) after the start of the engine 1.

At Step S100, the controller 10 determines whether a rotation speed R1 of the source pressure oil pump 101 is larger than a threshold value 1 or not. The rotation speed R1 is detected by a rotation speed sensor provided close to the source pressure oil pump 101. The threshold value 1 is a rotation speed at which such a supply flowrate can be obtained that the source pressure is not insufficient even if the shift oil pump 112 is operated in the forward direction at an upper limit value in ordinary shifting control. Specifically, the threshold value 1 is a value determined in accordance with specifications of the source pressure oil pump 101 in use and the shift oil pump 112 in use and specification of constitutions other than the variator 4 such as the lubrication system, the cooling system, the lockup clutch 2a and the like and is determined in advance by experiments and the like. The ordinary control here means control executed when the control of a discharge flowrate of the shift oil pump 112 described in one or more embodiments of the present invention is not executed.

When a determination result at Step S100 is affirmative, the controller 10 executes the ordinary control at Step S110. That is, the upper limit rotation speed of the shift oil pump 112 is set to the upper limit value in the ordinary control. The upper limit value in the ordinary control is determined by the specification of the shift oil pump 112 and is set to the rotation speed considering durability of a rotating component, for example.

When the determination result at Step S100 is negative, the controller 10 executes processing at Step S120.

At Step S120, the controller 10 determines whether a running range is selected or not. If the running range is selected, the controller 10 executes processing at Step S130, while if a non-running range is selected, it executes processing at Step S160. The running range is a range for running such as a drive range, a reverse range and the like. The non-running range is a range such as a parking range and a neutral range other than the running range.

At Step S130, the controller 10 determines whether the SEC hydraulic pressure is larger than a threshold value 2 or not. The threshold value 2 is a hydraulic pressure in a state where the shift oil passage 106 closer to the SEC side than the shift oil pump 112 and the SEC pulley oil chamber 42c are filled with oil (hereinafter referred to also as a filled state). In other words, the threshold value 2 is an upper limit hydraulic pressure at which the shift oil pump 112 in a non-operated state is not rotated by a differential pressure in the shift oil passage 106.

The controller 10 executes processing at Step S140 when the determination result at Step S130 is affirmative, while it executes processing at Step S150 if the result is negative.

At Step S140, the controller 10 limits an upper-limit rotation speed R2_max of the shift oil pump 112 to X1. X1 is determined as will be described below.

The supply flowrate of the oil pump is known to be determined by the following equation (1).

$$\text{Supply flowrate} = \text{oil pump rotation speed} \times \text{specific discharge amount} \times \text{pump efficiency } \eta \quad (1)$$

Here, the "specific discharge flowrate" is a discharge amount per rotation of a pump determined for each oil pump in use.

The controller 10 compares a rotation speed R2 of the shift oil pump 112 determined by the equation (2) with zero and makes a larger value X1.

$$R2 = (\text{supply flowrate for source pressure} - \text{clutch supply flowrate})/(\text{specific discharge amount} \times \text{pump efficiency } \eta) \quad (2)$$

Here, the "supply flowrate for source pressure" is an oil amount pumped up by the source pressure oil pump 101 from an oil tank and discharged. The "clutch supply flowrate" is a flowrate supplied to the forward/reverse switching mechanism 3. Moreover, the specific discharge amount and the pump efficiency $\eta$ are determined by the specification of the shift oil pump 112.

The equation (2) is obtained by modifying the "supply flowrate" in the equation (1) to "supply flowrate for source pressure—clutch supply flowrate" and then, by making it to an equation for calculating the oil pump rotation speed. That is, the rotation speed R2 calculated by the equation (2) is the rotation speed of the shift oil pump 112 when the supply flowrate of the shift oil pump 112 is equal to an oil amount obtained by subtracting an oil amount supplied to the forward/reverse switching mechanism 3 from the supply flowrate of the source pressure oil pump 101.

The upper-limit rotation speed R2_max is the larger value in the rotation speed R2 calculated by the equation 2 and zero. By setting the upper-limit rotation speed R2_max as above, when the shift oil pump 112 is operated, the supply flowrate of the shift oil pump 112 does not exceed the oil amount supplied to the shift oil passage 106 by the source pressure oil pump 101. As a result, lack of the source pressure by operating the shift oil pump 112 can be prevented.

The reason why the larger one is selected in comparison with zero is that it is sufficient to prohibit the operation of the shift oil pump 112 when the calculation result of the equation (2) is negative. The same applies to a calculation method of X2 to X4 which will be described below.

On the other hand, at Step S150, the controller 10 limits the upper-limit rotation speed R2_max to X2. X2 is determined as will be described below.

The controller 10 compares the rotation speed R2 of the shift oil pump 112 determined by the equation (3) with zero and makes the larger value X2.

$$R2 = (\text{Supply flowrate for source pressure} - \text{clutch supply flowrate} - \text{SEC pulley oil chamber supply flowrate})/(\text{specific discharge amount X pump efficiency } \eta) \quad (3)$$

The equation (3) is obtained by modifying the "supply flowrate" in the equation (1) to the "supply flowrate for source pressure—clutch supply flowrate—SEC pulley oil chamber supply flowrate" and then, by making it to an equation for calculating the oil pump rotation speed. That is, the rotation speed R2 calculated by the equation (3) is a rotation speed of the shift oil pump 112 when the supply flowrate of the shift oil pump 112 becomes equal to the oil amount obtained by subtracting the oil amount supplied to the forward/reverse switching mechanism 3 and the oil amount supplied to the SEC pulley oil chamber 42c from the supply flowrate of the source pressure oil pump 101.

R2 calculated by the equation (3) is smaller than R2 calculated by the equation (2) by a portion considering the "SEC pulley oil chamber supply flowrate".

The "SEC pulley oil chamber supply flowrate" not considered in the equation (2) is considered in the equation (3) due to the following reasons. The processing at Step S140 is executed when the SEC hydraulic pressure is larger than the threshold value 2, and the SEC pulley oil chamber 42c at this time is in the filled state. In this case, the relationship between the oil amount supplied to the shift oil passage 106 and the supply flowrate of the shift oil pump 112 only needs to be considered. On the other hand, the processing at Step S150 is executed when the SEC pulley oil chamber 42c is not in the filled state. Therefore, if the upper-limit rotation speed of the shift oil pump 112 is set similarly to Step S140, the oil amount supplied from the source pressure oil pump 101 runs short with respect to the supply flowrate of the shift oil pump 112 due to the supply to the SEC pulley oil chamber 42c, which incurs lack of the source pressure.

When calculating X1 at Step S140, the equation (3) may be used. In this case, the "SEC pulley oil chamber supply flowrate" in the equation (3) is zero.

As described above, when the running range is selected, the controller 10 sets the upper-limit rotation speed R2_max of the shift oil pump 112 by the processing at Step S140 or at Step S150.

On the other hand, when the non-running range is selected, the controller 10 makes determination similar to Step S130 at Step S160. The controller 10 executes the processing at Step S170 when the determination result at Step S160 is affirmative, while it executes the processing at Step S180 when the determination result is negative.

At Step S170, the controller 10 limits the upper-limit rotation speed R2_max to X3. X3 is determined as will be described below.

The controller 10 compares the rotation speed R2 of the shift oil pump 112 determined by the equation (4) with zero and makes the larger value X3.

$$R2 = \text{Supply flowrate for source pressure}/(\text{specific discharge amount} \times \text{pump efficiency } \eta) \quad (4)$$

The equation (4) is obtained by modifying the equation (1). The equation (2) used at Step S140 when the running range is selected has a term of the "clutch supply flowrate", but the equation (4) does not have the term. That is because the clutch supply flowrate does not have to be considered since neither of the forward clutch 31 nor the reverse brake 32 has to be engaged when the non-running range is selected. That is, R2 calculated by the equation (4) is the rotation speed at which the supply flowrate of the shift oil pump 112 becomes equal to the supply flowrate of the source pressure oil pump 101.

At Step S180, the controller 10 limits the upper-limit rotation speed R2_max to X4. X4 is determined as will be described below.

The controller 10 compares the rotation speed R2 of the shift oil pump 112 determined by the equation (5) with zero and makes the larger value X4.

$$R2 = (\text{Supply flowrate for source pressure} - \text{SEC pulley oil chamber supply flowrate})/(\text{specific discharge amount} \times \text{pump efficiency } \eta) \quad (5)$$

The equation (5) is obtained by excluding the term of the "clutch supply flowrate" from the equation (3) used at Step S150. That is because the clutch supply flowrate does not have to be considered in the non-running range as described above.

The rotation speed R2 calculated by the equation (5) is a rotation speed of the shift oil pump 112 when the supply flowrate of the shift oil pump 112 becomes equal to the oil amount obtained by subtracting the oil amount supplied to the SEC pulley oil chamber 42c from the supply flowrate of the source pressure oil pump 101.

By limiting the upper-limit rotation speed R2_max of the shift oil pump 112 as above, the discharge flowrate of the shift oil pump 112 can be made smaller than the discharge flowrate of the source pressure oil pump 101.

Figure 4:
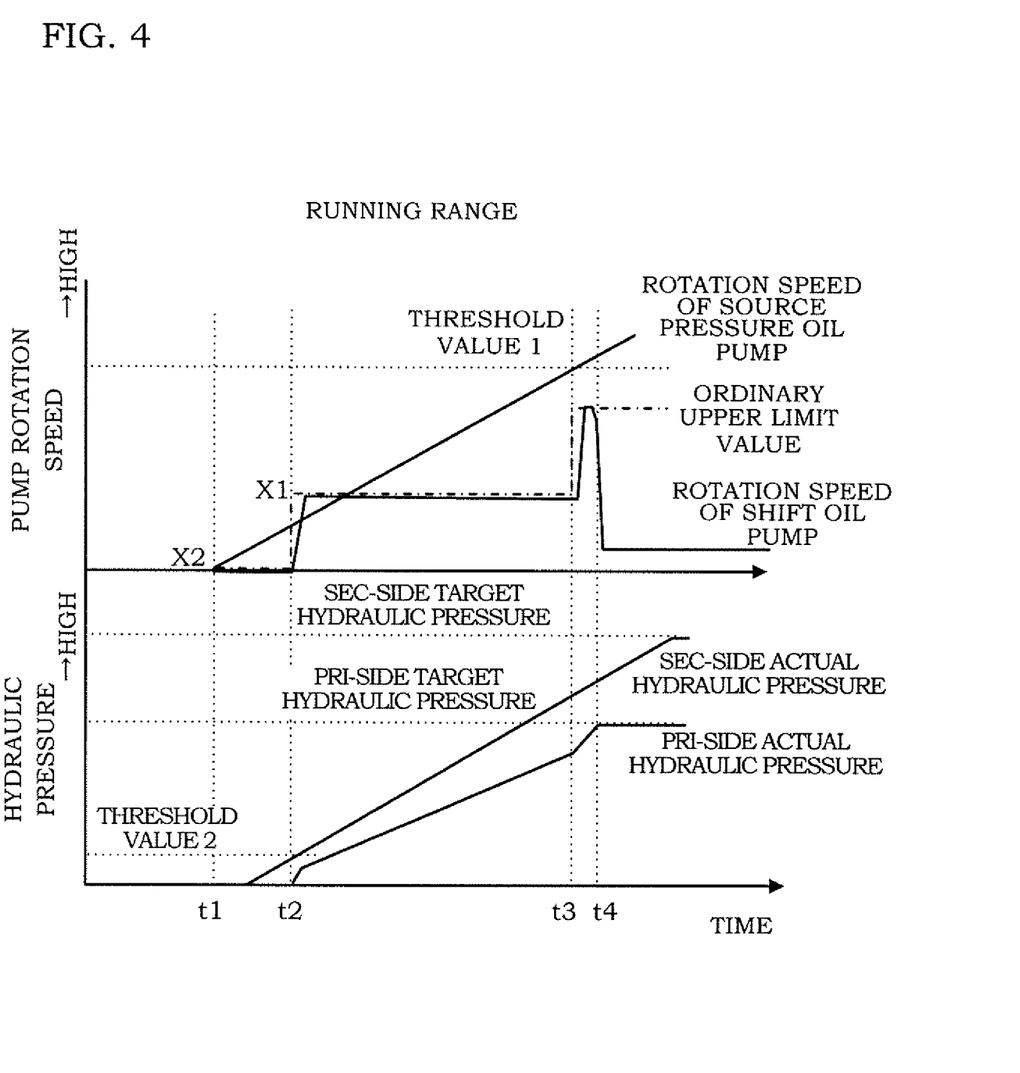
FIG. 4 is a timing chart when a running range is selected.
Figure 5:
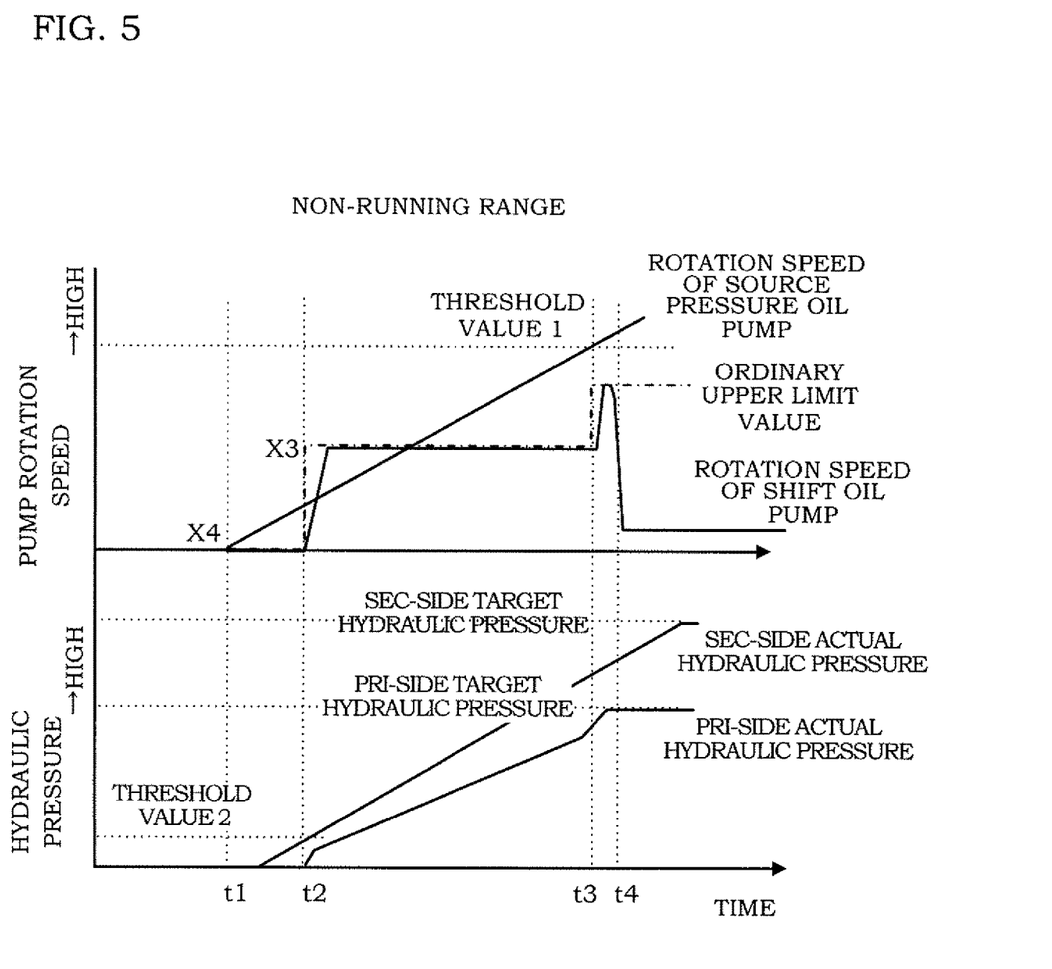
FIG. 5 is a timing chart when a non-running range is selected.

FIGS. 4 and 5 are timing charts when the control routine in FIG. 3 is executed. FIG. 4 illustrates a case where the running range is selected, and FIG. 5 illustrates a case where the non-running range is selected. One-dot chain lines in the figures are set values of the upper-limit rotation speed R2_max.

First, the case where the running range is selected (FIG. 4) will be described.

The source pressure oil pump 101 is operated at timing t1, and the rotation speed R1 of the source pressure oil pump 101 begins to rise. At this stage, the rotation speed R1 is smaller than the threshold value 1 and since the running range is selected, the controller 10 executes the processing at Step S130.

Until timing t2 when the SEC actual hydraulic pressure reaches the threshold value 2, a negative determination result is given at Step S130 and thus, the controller 10 sets the upper-limit rotation speed R2_max to X2 (S150). Then, when the SEC actual hydraulic pressure exceeds the threshold value 2, the controller 10 sets the upper-limit rotation speed R2_max to X1 (S140). A target value of the upper-limit rotation speed R2_max is changed stepwisely from X2 to X1 at timing t2, but the rotation speed of the shift oil pump 112 rises with a delay as indicated by a solid line in the figure. This delay also occurs similarly at timing t3 and t4 which will be described later.

When the rotation speed of the source pressure oil pump 101 reaches the threshold value 1 at the timing t3, the upper-limit rotation speed R2_max of the shift oil pump 112 is switched to the upper-limit rotation speed in ordinary control (S100, S110).

Then, at the timing t4 when the PRI actual hydraulic pressure reaches the PRI-side target hydraulic pressure according to the target speed ratio and after, the rotation speed of the shift oil pump 112 lowers to the rotation speed at which the current hydraulic pressure is maintained. Whether the PRI actual hydraulic pressure has reached the PRI-side target hydraulic pressure according to the target speed ratio or not can be also determined by detecting the PRI actual hydraulic pressure and by comparing it with the PRI-side target hydraulic pressure, but in one or more embodiments of the present invention, it is determined whether or not the actual speed ratio has become the target speed ratio. When the actual speed ratio has become the target speed ratio, the PRI actual hydraulic pressure has reached the PRI-side target hydraulic pressure and thus, the same result is obtained by any method for determination.

Subsequently, the case where the non-running range is selected (FIG. 5) will be described.

When the non-running range is selected, similarly to the case where the running range is selected, the source pressure oil pump 101 is operated at the timing t1, the SEC actual hydraulic pressure exceeds the threshold value 2 at the timing t2, the rotation speed of the source pressure oil pump 101 exceeds the threshold value 1 at the timing t3, and the actual speed ratio becomes the target speed ratio at the timing t4.

Then, the upper-limit rotation speed R2_max of the shift oil pump 112 is set to X4 from the timing t1 to the timing t2 (S180), it is set to X3 from the timing t2 to the timing t3 (S170), and it is set to the upper-limit rotation speed of the ordinary control at the timing t3 and after. However, when the non-running range is selected, the upper-limit rotation speed R2_max (X3) from the timing t2 to the timing t3 becomes larger than the case where the running range is selected (X1). That is caused by a difference between the calculation equation of X1 and the calculation equation of X3 described above, that is, a difference on whether the clutch supply flowrate is considered or not. There is also a difference in the calculation method for the upper-limit rotation speed R2_max from the timing t1 to the timing t2, but zero is selected in any case in FIGS. 4 and 5.

According to one or more embodiments of the present invention, one or more of the following effects may be obtained.

According to one or more embodiments of the present invention, since the discharge flowrate of the shift oil pump (electric oil pump) 112 is limited to an amount smaller than the discharge flowrate of the source pressure oil pump 101, lack of the source pressure can be prevented.

According to one or more embodiments of the present invention, the discharge flowrate of the shift oil pump 112 is limited when the rotation speed of the source pressure oil pump 101 is lower than a predetermined rotation speed (threshold value 1). Since the determination is made on the basis of the rotation speed as above, a flowrate sensor adapted to detect the discharge flowrate of the source pressure oil pump 101 is not needed any more.

In one or more embodiments of the present invention, since the rotation speed of the shift oil pump 112 is limited in order to limit the discharge flowrate of the shift oil pump 112, the discharge flowrate of the shift oil pump 112 can be limited without using a flowrate sensor.

In one or more embodiments of the present invention, when the running range is selected, the discharge flowrate of the shift oil pump 112 is made smaller than the case where the non-running range is selected. When the running range is selected, a higher source pressure is needed for engaging the forward clutch 31 or the reverse brake 32. According to one or more embodiments of the present invention, a state capable of start can be realized rapidly.

In one or more embodiments of the present invention, if the rotation speed of the source pressure oil pump 101 is lower than the predetermined rotation speed (threshold value 1) and the pressure of the SEC pulley oil chamber 42c is lower than the predetermined pressure (threshold value 2), the discharge flowrate of the shift oil pump 112 is made further smaller than the case where the pressure of the SEC pulley oil chamber 42c is higher than the predetermined pressure (threshold value 2). The lower the pressure of the SEC pulley oil chamber 42c, that is, the source pressure is, the more rapidly the source pressure needs to be raised in order to bring about the state capable of start. According to one or more embodiments of the present invention, since the discharge flowrate of the shift oil pump 112 is limited much smaller, the source pressure can be increased rapidly, and the state capable of start can be realized.

When the shift oil pump 112 is rotated in the opposite direction, the source pressure increases. That is, such a situation that the source pressure is insufficient by operation of the shift oil pump 112 occurs mainly when the shift oil pump 112 is rotated in the forward direction. Thus, the limiting of the discharge flowrate of the shift oil pump 112 may be limited to the case where the shift oil pump 112 is rotated in the direction (forward direction) in which the oil is discharged from the PRI pulley oil chamber 41c.

In one or more of the aforementioned embodiments, the constitution having both the mechanical oil pump (the source pressure oil pump 101) and the electric oil pump (the line-pressure electric oil pump 111) is described as an oil pump adapted to supply the source pressure, but the constitution may include only either one of them.

Embodiments of the present invention has been described above, but the aforementioned embodiment illustrates only a part of application examples of the present invention and is not intended to limit a technical scope of the present invention to the specific constitution of the aforementioned embodiment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method of a continuously variable transmission, comprising:
   supplying oil pressure to a line-pressure oil passage and a secondary pulley oil chamber by a source pressure oil pump;
   controlling a flow of oil into and from a primary pulley oil chamber by an electric oil pump arranged in an oil passage between the primary pulley oil chamber and the secondary pulley oil chamber; and
   limiting a discharge flowrate of the electric oil pump to an amount smaller than a discharge flowrate of the source pressure oil pump.

2. The control method of a continuously variable transmission according to claim 1,
   wherein the discharge flowrate of the electric oil pump is limited when a rotation speed of the source pressure oil pump is lower than a predetermined rotation speed.

3. The control method of a continuously variable transmission according to claim 2, further comprising:
   making the discharge flowrate of the electric oil pump further smaller than the case where the pressure of the secondary pulley oil chamber is higher than a predetermined pressure, if the rotation speed of the source pressure oil pump is lower than the predetermined rotation speed and a pressure of the secondary pulley oil chamber is lower than the predetermined pressure.

4. The control method of a continuously variable transmission according to claim 1,
   further comprising limiting a rotation speed of the electric oil pump in order to limit the discharge flowrate of the electric oil pump.

5. The control method of a continuously variable transmission according to claim 4, further comprising:

making the discharge flowrate of the electric oil pump smaller than in the case of a non-running range, if a shift range of the continuously variable transmission is a running range.

6. The control method of a continuously variable transmission according to claim 1,
wherein the discharge flowrate of the electric oil pump is limited when the electric oil pump is rotated in a direction where the oil is discharged from the primary pulley oil chamber.

7. A control device of a continuously variable transmission, comprising:
a source pressure oil pump adapted to supply a hydraulic pressure to a line-pressure oil passage and a secondary pulley oil chamber;
a shift oil passage connected to the line-pressure oil passage and adapted to cause a primary pulley oil chamber and the secondary pulley oil chamber to communicate with each other;
an electric oil pump interposed in the shift oil passage; and
a controller adapted to control a flow of oil into and from the primary pulley oil chamber by the electric oil pump,
wherein the controller limits a discharge flowrate of the electric oil pump to an amount smaller than a discharge flowrate of the source pressure oil pump.

* * * * *